(12) United States Patent
Kim et al.

(10) Patent No.: US 9,761,859 B2
(45) Date of Patent: Sep. 12, 2017

(54) SECONDARY BATTERY

(71) Applicant: SAMSUNG SDI CO., LTD., Yongin-si, Gyeonggi-do (KR)

(72) Inventors: Hyun-Chul Kim, Yongin-si (KR); Hyun Soh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 475 days.

(21) Appl. No.: 14/341,661

(22) Filed: Jul. 25, 2014

(65) Prior Publication Data
US 2015/0099163 A1  Apr. 9, 2015

(30) Foreign Application Priority Data
Oct. 8, 2013  (KR) .................. 10-2013-0119633

(51) Int. Cl.
*H01M 2/34* (2006.01)
*H01M 2/30* (2006.01)
(Continued)

(52) U.S. Cl.
CPC .......... *H01M 2/34* (2013.01); *H01M 2/0473* (2013.01); *H01M 2/06* (2013.01); *H01M 2/08* (2013.01);
(Continued)

(58) Field of Classification Search
None
See application file for complete search history.

(56) References Cited

U.S. PATENT DOCUMENTS 5,595,841 A * 1/1997 Suzuki .................. H01M 4/621
429/217
6,117,586 A 9/2000 Kim et al.
(Continued)

FOREIGN PATENT DOCUMENTS

EP  2 343 755 A1  7/2011
EP  2 461 393 A1  6/2012
(Continued)

OTHER PUBLICATIONS

Definition of stainless steel from www.dictionary.com (Nov. 21, 2016).*
(Continued)

*Primary Examiner* — Patrick Ryan
*Assistant Examiner* — Carmen Lyles-Irving
(74) *Attorney, Agent, or Firm* — Lewis Roca Rothgerber Christie LLP

(57) ABSTRACT

A secondary battery includes an electrode assembly, a battery case, and a cap assembly. The electrode assembly includes first and second electrodes. The battery case accommodates the electrode assembly therein and has an opened surface. The cap assembly seals the battery case and includes first and second terminal portions coupled to the respective first and second electrodes. In the secondary battery, at least one of the first and second terminal portions is coupled to a variable member including a plurality of variable plates. Accordingly, the path and resistance of current may be varied in the secondary battery, so that it is possible to reduce or prevent generation of heat caused by overcurrent. Thus, it may be possible to reduce or prevent an explosion and fire of the battery, thereby improving the safety of the battery.

18 Claims, 6 Drawing Sheets

(51) Int. Cl.
*H01M 2/04* (2006.01)
*H01M 2/06* (2006.01)
*H01M 2/08* (2006.01)

(52) U.S. Cl.
CPC .......... *H01M 2/30* (2013.01); *H01M 2200/00* (2013.01)

(56) References Cited

U.S. PATENT DOCUMENTS

| | | | |
|---|---|---|---|
| 6,143,442 A * | 11/2000 | Takahashi | H01M 2/0426 429/175 |
| 2003/0087146 A1 | 5/2003 | Chi | |
| 2010/0143792 A1 | 6/2010 | Kim | |
| 2011/0177381 A1 | 7/2011 | Oya et al. | |
| 2011/0183193 A1 * | 7/2011 | Byun | H01M 2/0426 429/178 |
| 2011/0189513 A1 | 8/2011 | Suzuki et al. | |
| 2011/0244309 A1 * | 10/2011 | Byun | H01M 2/043 429/158 |
| 2012/0058390 A1 | 3/2012 | Obayashi et al. | |
| 2012/0141845 A1 * | 6/2012 | Byun | H01M 2/043 429/61 |
| 2013/0059170 A1 | 3/2013 | Kim | |
| 2013/0089759 A1 | 4/2013 | Han et al. | |
| 2013/0089760 A1 | 4/2013 | Kim et al. | |
| 2013/0252079 A1 | 9/2013 | Guen et al. | |
| 2014/0011074 A1 | 1/2014 | Oda et al. | |
| 2014/0205897 A1 * | 7/2014 | Byun | H01M 2/30 429/179 |

FOREIGN PATENT DOCUMENTS

| | | |
|---|---|---|
| EP | 2 568 518 A1 | 3/2013 |
| EP | 2 579 357 A1 | 4/2013 |
| EP | 2 757 614 A1 | 7/2014 |
| GB | 2 330 234 A | 4/1999 |
| KR | 10-2007-0056428 | 6/2007 |
| KR | 10-2012-0024503 A | 3/2012 |
| KR | 10-2012-0060724 A | 6/2012 |
| KR | 10-1215376 | 12/2012 |
| KR | 10-2013-0106649 | 9/2013 |
| WO | WO 2012/133654 A1 | 10/2012 |

OTHER PUBLICATIONS

EPO Search Report dated Dec. 8, 2014, for corresponding European Patent application 14185115.4, (11 pages).
EPO Office action dated Mar. 29, 2016, for corresponding European Patent application 14185115.4, (4 pages).
KIPO Registration Determination Certificate dated Feb. 21, 2017, for corresponding Korean Patent Application No. 10-2013-0119633 (2 pages).

* cited by examiner

SECONDARY BATTERY

CROSS-REFERENCE TO RELATED APPLICATIONS

This application claims priority to and the benefit of Korean Patent Application No. 10-2013-0119633, filed on Oct. 8, 2013 in the Korean Intellectual Property Office, the entire contents of which are incorporated herein by reference in their entirety.

BACKGROUND

1. Field

An aspect of the present invention relates to a secondary battery.

2. Description of the Related Art

As industries of electronics, communications, and the like are rapidly developed, the spread of portable electronic devices such as a camcorder, a cellular phone, and a notebook PC has recently been increased. Accordingly, the use of secondary batteries has also been increased. The secondary batteries can be used not only for portable electronic devices but also medium- and large-sized apparatuses such as, for example, an electric tool, an automobile, a space transportation means, a motorbike, a motor scooter, and an aerial transportation means, which require high output and high power. The secondary batteries used for the medium- and large-sized apparatuses may utilize a large-capacity battery module or battery pack by connecting a plurality of battery cells in series or parallel.

Because the secondary battery used for the medium- and large-sized apparatuses uses a plurality of battery cells, heat is not readily emitted to the outside of the secondary battery due to a large amount of current. Therefore, the secondary battery may explode or combust due to the heat. Accordingly, various studies have been conducted to prevent or reduce the chance of explosion and/or fire of a battery by reducing the speed of a large quantity of lithium ions and electrons moving from a negative electrode toward a positive electrode of the battery due to an internal short circuit of the battery.

SUMMARY

Embodiments of the present invention provide a secondary battery having a variable member provided with a plurality of variable plates.

Embodiments of the present invention also provide a secondary battery having a structure in which the path of current may be varied.

Embodiments of the present invention also provide a secondary battery in which upper and lower non-coating portions are provided at positions not overlapped with each other.

Embodiments of the present invention also provide a secondary battery in which an insulation coating portion formed of an insulative material is provided so that current does not flow.

Embodiments of the present invention also provide a secondary battery in which an insulating opening and a cut-away portion are provided so that the path of current is lengthened.

Embodiments of the present invention also provide a secondary battery having a structure in which the resistance of current may be decreased.

According to an embodiment of the present invention, a secondary battery includes: an electrode assembly including first and second electrodes; a battery case accommodating the electrode assembly therein, the battery case having an opened surface; and a cap assembly sealing the battery case, the cap assembly including first and second terminal portions coupled to the respective first and second electrodes, wherein at least one of the first and second terminal portions is coupled to a variable member including a plurality of variable plates.

The plurality of variable plates may be a stacked structure.

Each of the plurality of variable plates may have a through-hole at a center of and extending through the respective variable plate.

An insulation coating portion may be at an upper or lower surface of the plurality of variable plates. An upper or lower non-coating portion without an insulation coating material may be at a portion, respectively, of the upper or lower surface of the plurality of variable plates.

The upper and lower non-coating portions may be at positions not overlapped with each other on respective ones of the plurality of variable plates.

The upper non-coating portion may be at one upper portion around a portion of the through-hole of each of the plurality of variable plates. The lower non-coating portion may be at an other lower portion around another portion of the through-hole of each of the plurality of variable plates.

The insulation coating portion may include at least one material selected from the group consisting of vinyl, rubber, polyethylene, germanium, silicon, silica, epoxy, polymer, alumina, magnesia, and selenium.

At least one of the plurality of variable plates may have at least one insulating opening at the insulation coating portion and extending through the variable plate.

At least one of the plurality of variable plates may have at least one cut-away portion at the insulation coating portion.

The cut-away portion may open one end portion of the insulation coating portion at a side of the variable plate.

The battery case and the first terminal portion may have a positive polarity. The variable member may be coupled to a lower portion of the first terminal portion and have the positive polarity.

The variable member may be a structure in which first, second, and third variable plates are stacked. A thin film layer may be on upper and lower surfaces of the second variable plate, the second variable plate being between the first and third variable plates.

The first, second, and third variable plates may include at least one material selected from the group consisting of carbon (C), iron (Fe), nickel (Ni), chrome (Cr), silicon (Si), manganese (Mn), phosphorus (P) and sulfur (S). The first, second, and third variable plates may include different materials.

The variable member may further include a conductive member at at least one of the plurality of variable plates and between two of the variable plates.

As described above, according to the example embodiments of the secondary battery of the present invention, the variable member provided with the plurality of variable plates may be coupled to (e.g., electrically fastened to) the positive electrode terminal, so that heat generated by overcurrent occurring in an internal short circuit can be lowered, thereby increasing the safety of the battery.

Further, the insulation coating portion, the upper non-coating portion, and the lower non-coating portion may be formed in the variable member, so that it is possible to control the flow of current and to vary the resistance of the variable member.

Further, the upper and lower non-coating portions may be positioned not to overlap with each other, so that the flowing path of current is lengthened. Accordingly, it is possible to reduce or minimize the amount of the flowing current, thereby reducing heat generated and/or accumulated in the battery.

Further, the insulation coating portion may be provided to the variable plate, so that the flowing path of current may be arbitrarily controlled.

Further, the flowing path of current may be further lengthened by providing the insulating opening and the cut-away portion, so that the amount of the flowing current may be decreased in the occurrence of overcurrent, thereby reducing or preventing the generation of heat.

Further, the resistance of the variable member may be controlled by stacking variable plates made of different materials, so that the flowing speed of the current is decreased, thereby reducing or preventing the chance of explosion and fire of the battery.

BRIEF DESCRIPTION OF THE DRAWINGS

Example embodiments will now be described more fully hereinafter with reference to the accompanying drawings; however, the present invention may be embodied in many different forms and should not be construed as limited to the embodiments set forth herein. Rather, these embodiments are provided so that this disclosure will be thorough and complete, and will fully convey the scope of the present invention to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
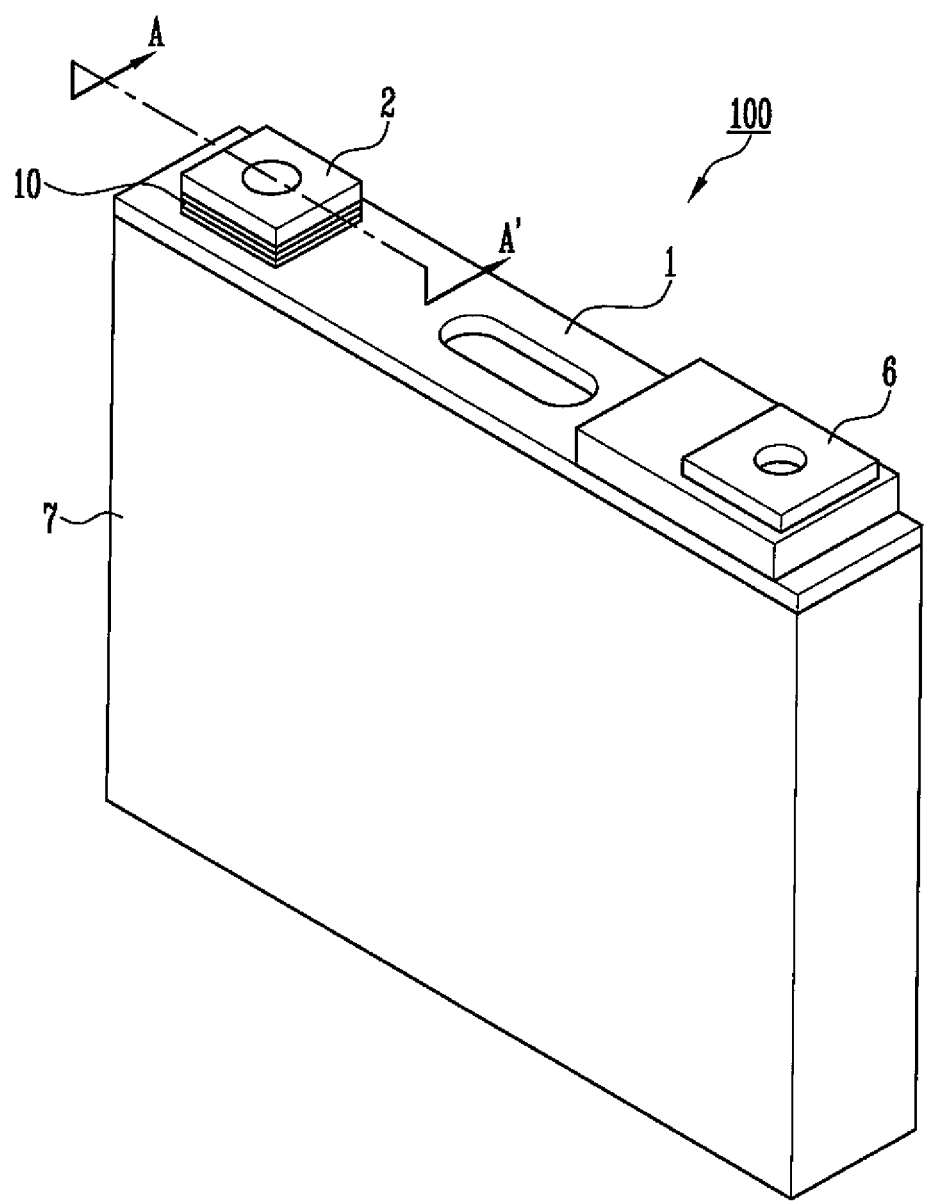
FIG. 1 is a perspective view showing the external appearance of a secondary battery according to an embodiment of the present invention.

In the following detailed description, only certain example embodiments of the present invention will be shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Expressions, such as "at least one of," when preceding a list of elements modify the entire list of elements and do not modify the individual elements of the list. As used herein, the term "and/or" includes any and all combinations of one or more of the associated listed items. Further, the use of "may" when describing embodiments of the present invention refers to "one or more embodiments of the present invention."

Figure 2:
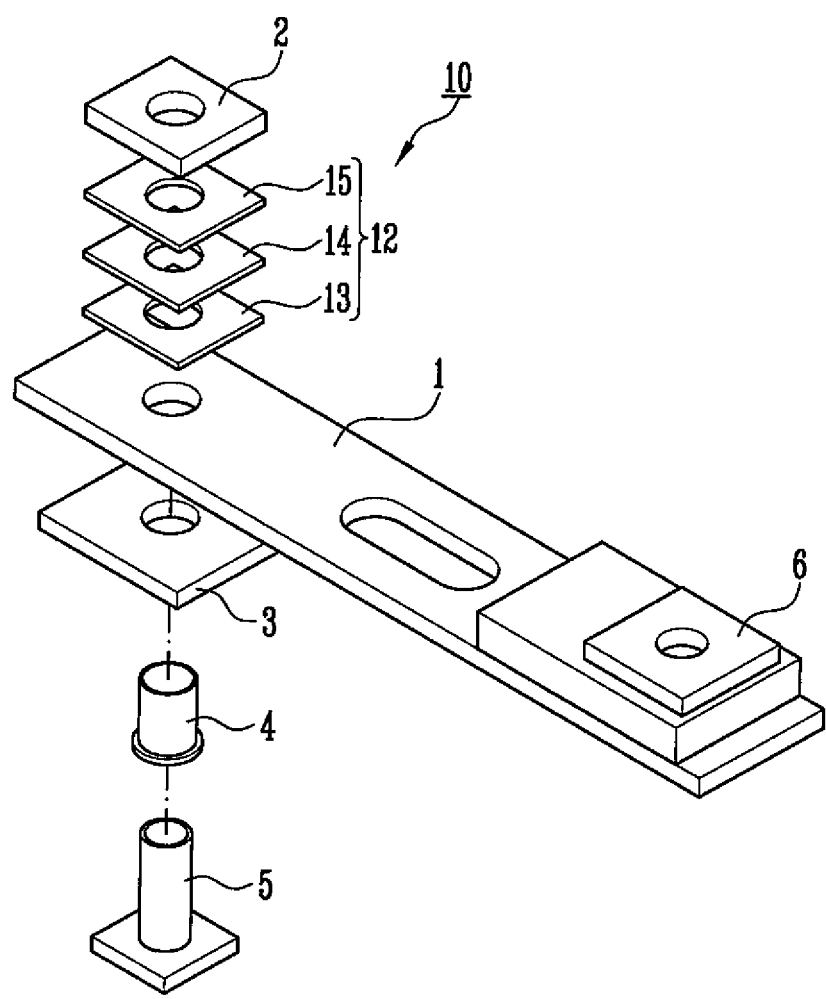
FIG. 2 is an exploded perspective view showing a cap assembly according to the embodiment of the present invention.
Figure 3:
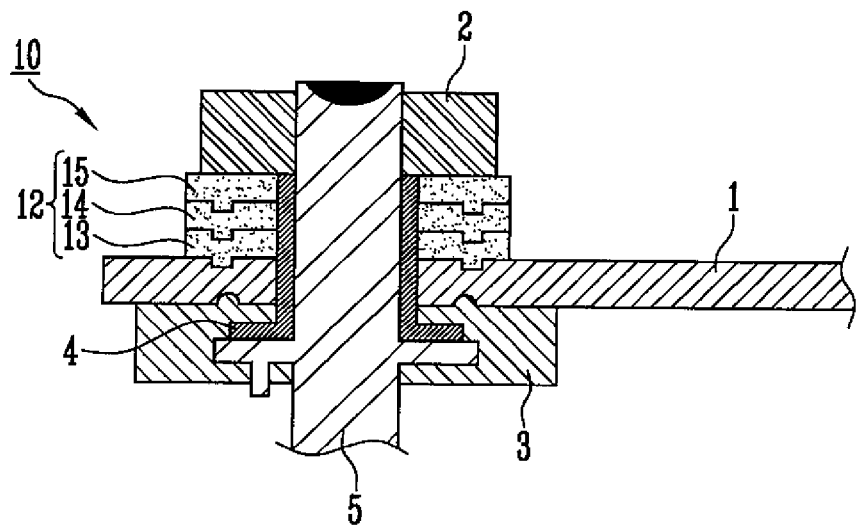
FIG. 3 is a partial sectional view taken along the line A-A' of the secondary battery according to the embodiment of the present invention.

FIG. 1 is a perspective view showing the external appearance of a secondary battery 100 according to an embodiment of the present invention. FIG. 2 is an exploded perspective view showing a cap assembly according to the embodiment of the present invention. FIG. 3 is a partial sectional view taken along the line A-A' of the secondary battery 100 according to the embodiment of the present invention.

As shown in FIGS. 1 to 3, the secondary battery 100 according to this embodiment includes an electrode assembly configured to have first and second electrode portions (e.g., first and second electrodes); a battery case 7 configured to accommodate the electrode assembly therein, the battery case 7 having an opened surface; and a cap assembly 8 configured to seal (e.g., hermetically seal) the battery case 7, the cap assembly 8 having first and second terminal portions 2 and 6 (e.g., first and second terminals) coupled to (e.g., electrically connected to) the respective first and second electrode portions.

The battery case 7 may have a positive polarity (e.g., may be positively biased) and is formed in a rectangular shape to accommodate the electrode assembly and an electrolyte therein. Although it has been illustrated in FIG. 1 that the battery case 7 is formed in a rectangular shape, the battery case 7 may be formed in, for example, a cylindrical shape, a pouch shape, a coin shape, etc., and the present invention is not limited to the shapes described above.

The cap assembly 8 has the first terminal portion 2 having a positive polarity and the second terminal portion 6 having a negative polarity. The cap assembly 8 is positioned on a top of the battery case 7 to seal (e.g., hermetically seal) the battery case 7. The cap assembly 8 may include a cap plate 1, the first and second terminal portions 2 and 6, a gasket 3, an insulator 4, and a through-portion 5.

Figure 5A:
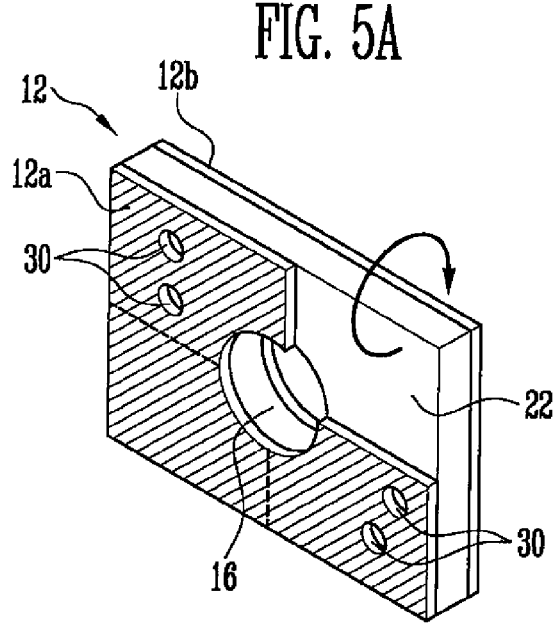
FIG. 5A is a view showing a front surface of a variable plate in a secondary battery according to another embodiment of the present invention.
Figure 5B:
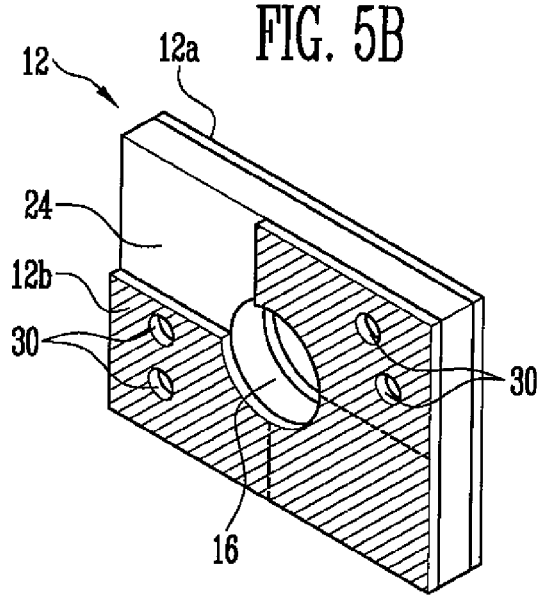
FIG. 5B is a view showing a rear surface of the variable plate.
Figure 5C:
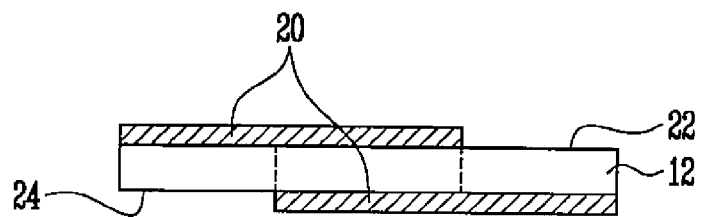
FIG. 5C is a sectional view of the variable plate.

A variable member 10, as shown in FIGS. 1 and 2, may be positioned between the cap plate 1 and the first terminal portion 2. The variable member 10 may be coupled to (e.g., electrically connected to) the first terminal portion 2 having the positive polarity to also have the positive polarity. As shown in FIGS. 5A to 5C, the variable member 10 may be formed into a structure in which a plurality of variable plates 12 are stacked, and a through-hole 16 vertically passing through the variable plates 12 may be formed at the center of the variable plates 12 so that the plurality of variable plates 12, the cap plate 1, and the first terminal portion 2 can be fastened (e.g., closely fastened) to one another.

The size of the through-hole 16 may correspond to or be greater than a size of the through-portion 5 so that the variable plates 12, the cap plate 1, and the first terminal portion 2 may be fastened (e.g., closely fastened) to one another. The volume of the through-hole 16 may be formed to be about two to about five times greater than the unit volume of the through-portion 5.

Because the plurality of variable plates 12 may be provided as described above, the amount of flowing current may be decreased according to the resistance of the plurality of variable plates 12 as the current flows in or through the plurality of variable plates 12, and accordingly, the temperature of the plurality of variable plates 12 may also be reduced.

Here, the variable member 10, as shown in FIGS. 2 and 3, may be formed into a structure in which first, second, and third variable plates 13, 14 and 15 are stacked. In the structure, a thin film layer (e.g., an aluminum thin film layer) may be formed on upper and/or lower surfaces of the second variable plate 14 so that the resistance can be efficiently lowered. Because the thin film layer may be further formed on the intermediate plate as described above, the thin film layer may melt at a temperature of, for example, about 300 to about 600° C., to couple (e.g., connect) the first and third variable plates 13 and 15 respectively positioned at upper and lower portions or ends of the variable member 10, thereby decreasing the resistance.

The variable member 10 may include the first, second, and third variable plates 13, 14, and 15, each formed of a conductive material, for example, at least one material selected from the group consisting of carbon (C), iron (Fe), nickel (Ni), chrome (Cr), silicon (Si), manganese (Mn), phosphorus (P), and sulfur (S). However, the present invention is not limited to the conductive materials described above, and any conductive material is applicable.

The first, second, and third variable plates 13, 14, and 15 may be formed of different materials so that the resistance is increased.

Figure 4:
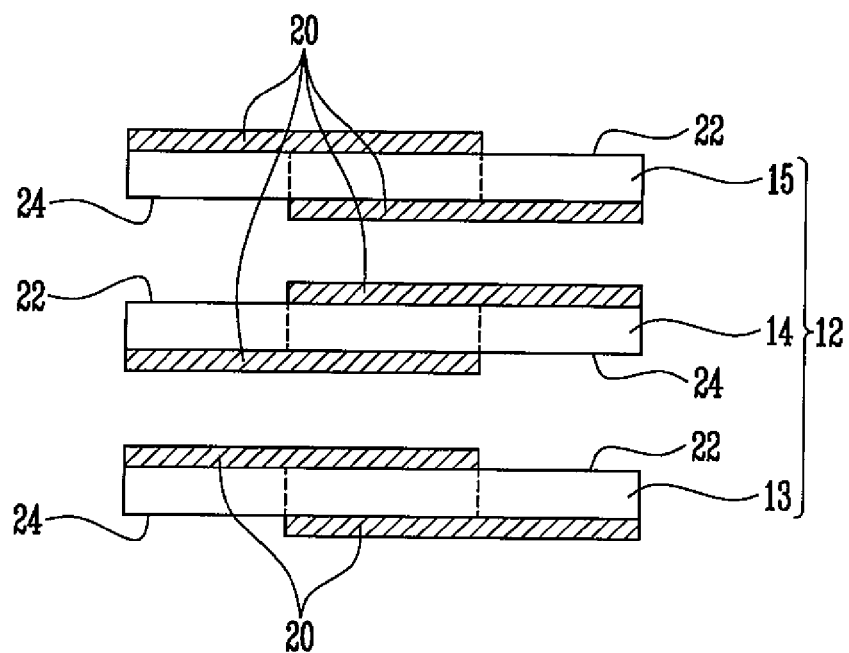
FIG. 4 is an enlarged view showing the sections of variable plates shown in FIG. 3.

FIG. 4 is an enlarged view showing the sections of the variable plate 12 of FIG. 3.

As shown in FIG. 4, each of the variable plates 13, 14, and 15 may include an insulation coating portion 20, an upper non-coating portion 22, and a lower non-coating portion 24.

The insulation coating portion 20 refers to an area at which an insulative material is coated on the upper or lower surface of each of the variable plates 13, 14, and 15 so that current cannot flow in or through that portion of the variable plates 13, 14, and 15. The insulative material may be coated using, for example, at least one material selected from the group consisting of vinyl, rubber, polyethylene, germanium, silicon, silica, epoxy, polymer, alumina, magnesia, and selenium. However, the present invention is not limited thereto, and any insulative material is applicable as long as it is a material that is electrically insulative.

The insulation coating portion 20 may also be formed on side surfaces of the variable plates 13, 14, and 15 in order to reduce or minimize the conduction of a large amount of current.

The upper non-coating portion 22 refers to an area at which an insulation coating material is not deposited on the upper surface of the variable plates 13, 14, and 15. The lower non-coating portion 24 refers to an area at which an insulation coating material is not deposited on the lower surface of the variable plates 13, 14, and 15. Referring to FIGS. 5A and 5B, to be further described later, the upper and lower non-coating portions 22 and 24 are areas at which current may flow. The upper and lower non-coating portions 22 and 24 may be formed at positions not overlapped with each other. For example, the upper non-coating portion 22 is formed at one upper portion based on the through-hole 16 of one of the variable plates 12 (e.g., the upper non-coating portion 22 may be formed around a portion of the through-hole 16), and the lower non-coating portion 24 is formed at an other lower portion based on the through-hole 16 of one of the variable plates 12 (e.g., the lower non-coating portion 24 may be formed around another portion of the through-hole 16). Accordingly, the path along which current flows in or through each of the variable plates 12—through the upper non-coating portion 22 to the lower non-coating portion 24—may be lengthened, thereby decreasing the amount of the current.

In a case where a plurality of variable plates 13, 14, and 15 are stacked, as shown in FIG. 4, the upper non-coating portion 22 of the first variable plate 13 may be positioned along a same vertical line as the lower non-coating portion 24 of the second variable plate 14, and the upper non-coating portion 22 of the second variable plate 14 may be positioned along a same vertical line as the lower non-coating portion 24 of the third variable plate 15. Because the upper and lower non-coating portions 22 and 24 may be positioned as described above, the plurality of variable plates 12 may be coupled (e.g., electrically connected). Although it has been illustrated in FIG. 4 that the insulation coating portion 20 is formed an lower surfaces of the second and third variable plates 14 and 15, the present invention is not limited thereto, and both lower surfaces of the second and third variable plates 14 and 15 may be formed as non-coating portions.

FIG. 5A is a view showing a front surface of one of the variable plates 12 in the secondary battery 100 according to another embodiment of the present invention, FIG. 5B is a view showing a rear surface of the one of the variable plates 12 shown in FIG. 5A, and FIG. 5C is a sectional view of the one of the variable plates 12 shown in FIGS. 5A and 5B.

As shown in FIGS. 5A and 5B, at least one insulating opening 30 (e.g., at least one insulating hole) vertically passing through the insulation coating portion 20 may be formed in the plurality of variable plates 12.

The insulating openings 30 may be formed in the insulation coating portion 20 so that the path along which current flows in the variable plates 12—through the lower non-coating portion 22 on the rear surface 12b of one of the variable plates 12 to the upper non-coating portion 24 on the front surface 12a of an other one of the variable plates 12—may be lengthened. Because the insulating openings 30 are further formed, the path along which the current can flow is narrow and limited, thereby decreasing the amount of the flowing current.

Figure 6A:
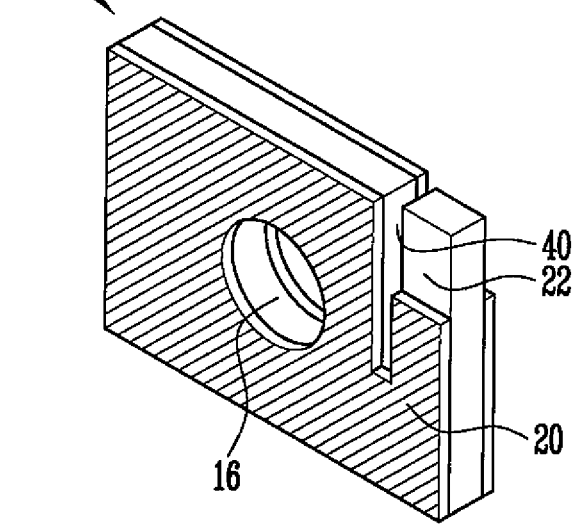
FIG. 6A is a view showing a front surface of a variable plate in a secondary battery according to another embodiment of the present invention.
Figure 6B:
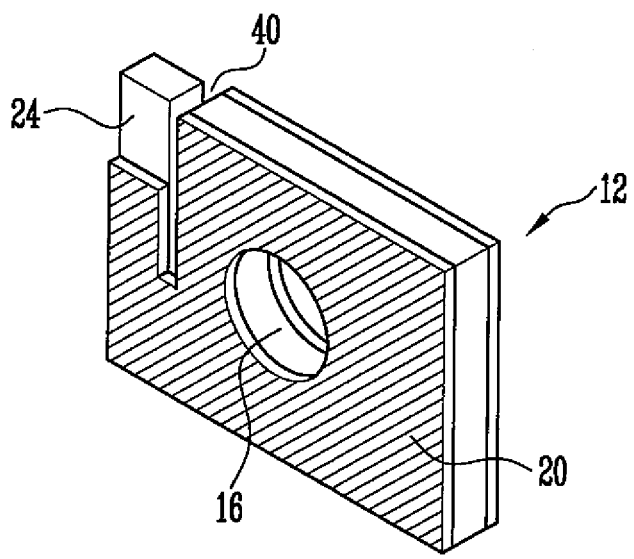
FIG. 6B is a view showing a rear surface of the variable plate rotated 180 degrees from left to right.

FIG. 6A is a view showing a front surface of one of the variable plates 12 in the secondary battery according to another embodiment of the present invention, and FIG. 6B is a view showing a rear surface of the one of the variable plates 12 shown in FIG. 6A rotated 180 degrees from left to right.

As shown in FIGS. 6A and 6B, the insulation coating portion 20 may further include at least one cut-away portion 40.

The cut-away portion 40 is cut away to open one end portion at one point of the insulation coating portion 20 (e.g., the cut-away portion 40 opens one end portion of the insulation coating portion at a side of one of the variable plates 12). For example, as shown in FIGS. 6A and 6B, the cut-away portion 40 may be formed at one side of the upper non-coating portion 22 and one side of the lower non-coating portion 24 so that the path along which current flows (e.g., moves) is lengthened. However, the position, shape, and size of the cut-away portion 40 is not limited to the structure shown in FIG. 6, and the cut-away portion 40 may be formed in a different position, shape, or size.

Because the cut-away portion 40 may be further formed in the insulation coating portion 20 of the variable plate 12 as described above, the path along which the current flows (e.g., moves) through each of the variable plates 12 can be more efficiently controlled.

Figure 7A:
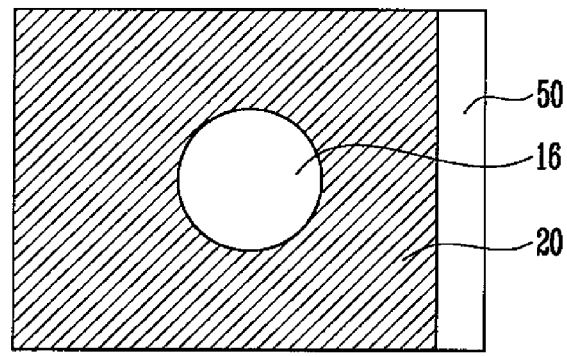
FIG. 7A is a view showing a variable plate in a secondary battery according to still another embodiment of the present invention.
Figure 7B:
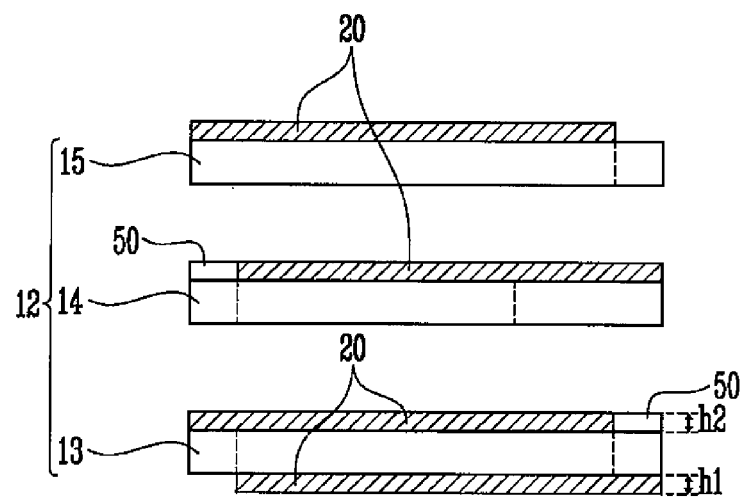
FIG. 7B is a sectional view of variable plates according to still another embodiment of the present invention.
Figure 7C:
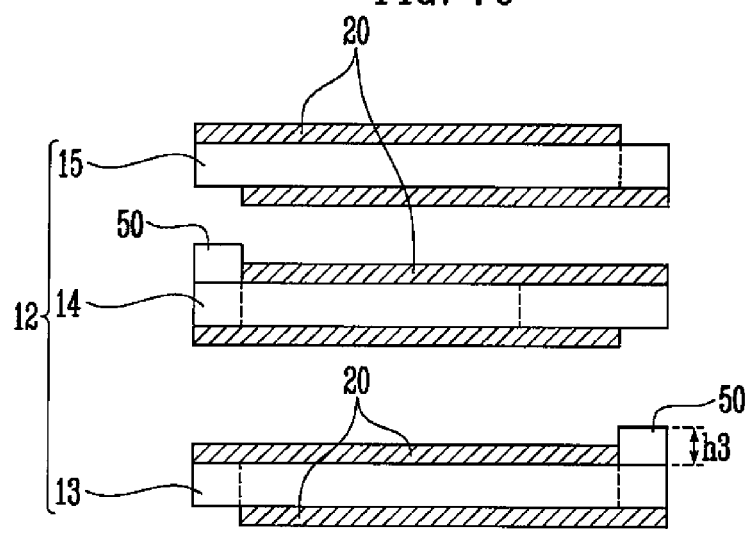
FIG. 7C is a sectional view of variable plates according to still another embodiment of the present invention.

FIG. 7A is a plan view showing one of the variable plates 12 in the secondary battery 100 according to still another embodiment of the present invention, FIG. 7B is a sectional view of variable plates 13, 14, and 15 according to still another embodiment of the present invention, and FIG. 7C is a sectional view of variable plates 13, 14, and 15 according to still another embodiment of the present invention.

As shown in FIG. 7A, the variable plates 12 may have a conductive member 50 provided between a plurality of the variable plates 12 (e.g., one or more of the variable plates 13, 14, and 15 may have the conductive member 50 provided thereon). The conductive member 50 may be formed of, for example, at least one material selected from the group consisting of aluminum (Al), indium (In), silver (Ag), and copper (Cu).

The conductive member 50, as shown in FIG. 7A, may have a size (e.g., a length) corresponding to a size (e.g., a length) of the upper or lower non-coating portion 22 or 24 of the variable plate 12 and be formed with (e.g., integrally formed with) the upper or lower non-coating portion 22 or 24 of the variable plate 12. However, the present invention is not limited to the shape and size shown in FIG. 7A, and the conductive member 50 may be formed in various shapes and sizes.

FIG. 7B is a sectional view showing variable plates 13, 14, and 15 according to still another embodiment of the present invention.

As shown in FIG. 7B, in a case where both lower surfaces of the second and third variable plates 14 and 15 are formed as lower non-coating portions in the structure in which the first, second, and third variable plates 13, 14, and 15 are stacked, the conductive member 50 may be provided to the first and second variable plates 13 and 14 and between the first and second variable plates 13 and 14 and between the second and third variable plates 14 and 15. For example, the conductive member 50 may be provided on the upper surface of the upper non-coating portion of the first variable plate 13 and the upper surface of the upper non-coating portion of the second variable plate 14.

A height h2 of the conductive member 50 may be formed to correspond to a height h1 of the insulation coating portion 20. The conductive member 50 may have a size (e.g., a length) corresponding to that of the upper non-coating portion. Accordingly, when the first, second, and third variable plates 13, 14, and 15 are stacked, the variable plates may be coupled (e.g., closely coupled) without the occurrence of any step difference.

FIG. 7C is a sectional view showing variable plates 13, 14, and 15 according to still another embodiment of the present invention.

As shown in FIG. 7C, in a case where the insulation coating portion 20 is formed on the upper and lower surfaces of the first, second, and third variable plates 13, 14, and 15 in the structure in which the first, second, and third variable plates 13, 14, and 15 are stacked, a height h3 of the conductive member 50 may be formed so that a step difference (e.g., h1+h1=h3) is generated in the first and second variable plates 13 and 14 and between the second and third variable plates 14 and 15. The conductive member 50 may be formed in a shape corresponding to the upper non-coating portion of the first variable plate 13 and the lower non-coating portion of the second variable plate 14. The conductive member may be formed having a shape corresponding to the upper non-coating portion of the second variable plate 14 and the lower non-coating portion of the third variable plate 15.

Because the conductive member 50 may be formed as described above, it is possible to prevent or reduce current from being cut off due to the step difference between the variable plates 12.

As described above, in the secondary battery, the variable member may be provided between the cap plate and the terminal, so that it is possible to control the speed of a large quantity of lithium ions and electrons moving from the negative electrode toward the positive electrode during the occurrence of an internal short circuit. Accordingly, it is possible to reduce or prevent an explosion and/or fire of the battery caused by a sudden generation of heat, thereby improving the safety of the battery. In addition, the upper and lower non-coating portions may be positioned so as to not overlap with each other, so that the flowing path of current is lengthened, thereby reducing heat generated and/or accumulated in the battery.

Further, the flowing path of current may be further lengthened by providing the insulating opening and the cut-away portion, so that the flowing amount of current may be decreased during the occurrence of overcurrent, thereby reducing or preventing the generation of heat.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A secondary battery comprising:
   an electrode assembly comprising first and second electrodes;
   a battery case accommodating the electrode assembly therein, the battery case having an opened surface;
   a cap assembly sealing the battery case, the cap assembly comprising a cap plate, a first through-portion extending through the cap plate, and first and second terminal portions outside of the battery case, the first and second terminal portions respectively coupled to the first and second electrodes, the first terminal portion being connected to the first electrode via the first through-portion; and a variable member comprising a plurality of variable plates between the cap plate and one of the first and second terminal portions, at least one of the variable plates having an electrically insulative coating on a portion of an upper or lower surface thereof.

2. The secondary battery of claim 1, wherein the plurality of variable plates are a stacked structure.

3. The secondary battery of claim 1, wherein each of the variable plates has a through-hole at a center thereof and extending through the variable plate.

4. The secondary battery of claim 3,
wherein the at least one of the variable plates has a coating portion without an electrically insulative coating at an other portion the upper or lower surface of the at least one of the variable plates adjacent the portion thereof having the electrically insulative coating.

5. The secondary battery of claim 4, wherein the at least one of the variable plates has the electrically insulative coating at both the upper and lower surfaces thereof, and
wherein the electrically insulative coating at the upper surface and the electrically insulative coating at the lower surface of the at least one of the variable plates are at non-overlapping positions in a direction from the upper surface toward the lower surface.

6. The secondary battery of claim 5, wherein the electrically insulative coating on the upper surface of the at least one of the variable plates is at one portion around the through-hole thereof, and
wherein the electrically insulative coating on the lower surface of the at least one of the variable plates is at an other portion around the through-hole thereof.

7. The secondary battery of claim 4, wherein the electrically insulative coating comprises at least one material selected from the group consisting of vinyl, rubber, polyethylene, germanium, silicon, silica, epoxy, polymer, alumina, magnesia, and selenium.

8. The secondary battery of claim 4, wherein the at least one of the variable plates has at least one insulating opening in the electrically insulative coating and extending through the at least one of the variable plates.

9. The secondary battery of claim 4, wherein the at least one of the variable plates has at least one cut-away portion at the portion thereof having the electrically insulative coating.

10. The secondary battery of claim 9, wherein the cut-away portion opens one end portion of the electrically insulative coating at a side of the at least one of the variable plates.

11. The secondary battery of claim 1, wherein the battery case and the first terminal portion have a positive polarity, and
wherein the variable member is coupled to a lower portion of the first terminal portion and has the positive polarity.

12. The secondary battery of claim 1, wherein the variable member is a structure in which first, second, and third variable plates are stacked.

13. The secondary battery of claim 12, wherein the first, second, and third variable plates comprise at least one material selected from the group consisting of carbon (C), iron (Fe), nickel (Ni), chrome (Cr), silicon (Si), manganese (Mn), phosphorus (P), and sulfur (S).

14. The secondary battery of claim 13, wherein the first, second, and third variable plates comprise different materials.

15. The secondary battery of claim 1, wherein the variable member further comprises a conductive member between two of the variable plates.

16. A secondary battery comprising:
an electrode assembly comprising first and second electrodes;
a battery case accommodating the electrode assembly therein, the battery case having an opened surface;
a cap assembly comprising a cap plate sealing the battery case, a first terminal, a through-portion electrically coupling the first electrode to the first terminal, and an insulator surrounding a periphery of the through-portion; and
a plurality of variable plates stacked between the cap plate and the first terminal, the variable plates being stacked in a direction from the cap plate toward the first terminal, each of the variable plates having an opening extending therethrough in the stacking direction, the through-portion and the insulator extending through the openings of the variable plates, at least one of an upper surface and a lower surface of one of the variable plates being partially coated with an electrically insulative material such that a remaining portion of the at least one of the upper and lower surfaces of the one of the variable plates is exposed.

17. The secondary battery of claim 16, wherein both the upper surface and the lower surface of the one of the variable plates are partially coated with the electrically insulative material, and
wherein the electrically insulative material is coated on a first portion of the upper surface with respect to the opening therein, and the electrically insulative material is coated on a second portion of the lower surface with respect to the opening, the first and second portions being offset from each other in a cross-sectional view along the stacking direction.

18. The secondary battery of claim 16, wherein the electrically insulative material comprises at least one material selected from the group consisting of vinyl, rubber, polyethylene, germanium, silicon, silica, epoxy, polymer, alumina, magnesia, and selenium.

* * * * *